Feb. 16, 1954   W. GUGGER   2,669,451
DEVICE FOR DRIVING FILMS IN CINEMATOGRAPHIC PROJECTORS
Filed June 21, 1950

INVENTOR
Walter Gugger

BY

ATTORNEY

Patented Feb. 16, 1954

2,669,451

UNITED STATES PATENT OFFICE 2,669,451

DEVICE FOR DRIVING FILMS IN CINEMATOGRAPHIC PROJECTORS

Walter Gugger, Yverdon, Switzerland, assignor to Paillard S. A., a corporation of Switzerland Application June 21, 1950, Serial No. 169,395

Claims priority, application Switzerland July 15, 1949

6 Claims. (Cl. 271—2.3)

Devices for driving and guiding a film in a cinematographic projector are already known, which are constituted by members mounted in a removable manner, which enables them to be replaced by others, allowing of the projection in the same apparatus of films of different sizes. The said members are in principle the shutter, the presser channel, the sprocket wheel and their claws, that is to say the support of the guide rollers co-operating therewith. The shutter and the presser channel are essentially guide members.

In the known driving devices with interchangeable members, the sprocket wheel is generally held in the operating position on its spindle, by means of a milled nut which must be unscrewed and screwed up during changing. Time is lost by the operator, whilst there is also a risk of damaging the threads of the spindle and nut in the course of time, the change not always being carried out under good conditions of lighting. Similar difficulties and inconveniences also exist in connection with the changing of the claws of the sprocket wheel, that is to say in connection with the guide rollers co-operating therewith.

The present invention relates to a device for driving a film in a cinematographic projector provided with a sprocket wheel with the support for the guide rollers co-operating therewith.

The invention has for its object to obviate the above mentioned disadvantages by the fact that the sprocket wheel is provided with a locking member with a spring co-operating with a recess of its spindle, so as to retain it automatically on the latter in the operative position, the support being mounted in a sliding manner on guides of the wall of the apparatus and provided with at least two openings allowing of the release of the said guides by placing the latter opposite the former and moving it perpendicularly to its plane of sliding.

One form of construction of the subject of the invention is shown by way of example in the accompanying drawings wherein.

Figure 1:
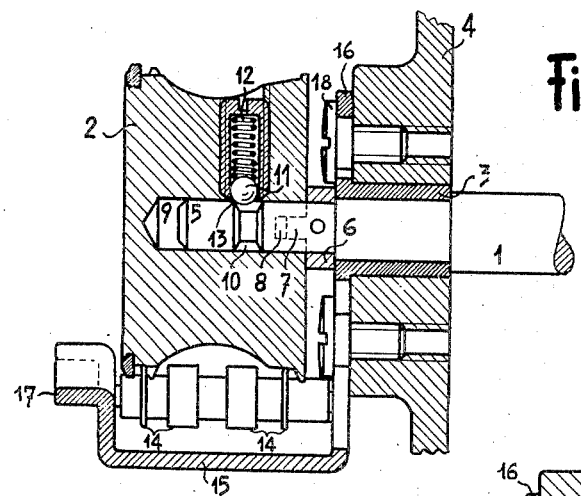
Fig. 1 is a section on the line I—I of Fig. 3.

The spindle 1 of the sprocket wheel 2 turns in a bearing 3 in the wall 4 of the apparatus. The end 5 of the spindle 1 which projects to the outside, carries a coupling member formed by a washer 6 secured thereto by a pin. The washer is provided with two teeth 7 adapted to penetrate into two corresponding recesses 8 of the body of the sprocket wheel, located on opposite sides of its bore 9 into which penetrates the end 5 of the spindle.

This end is provided with a circular groove 10 co-operating with a spring catch formed by a ball 11 urged by a spring 12 in a radial seating of the body of the sprocket wheel. As will be seen in Fig. 1, the central plane of the groove 10 does not correspond with the central plane of the catch, so that the ball 11 bears against the front edge 13 of the groove and applies, by the action of the spring 12, an axial thrust on the body of the sprocket-wheel, pushing the latter against the washer 6, that is to say ensuring automatically the engagement of the members 7 and 8 forming the claw coupling of the sprocket-wheel.

For the setting in position and the removal of the sprocket-wheel 2, it suffices to move it axially on the end 5 of the spindle 1 for engaging the catch 11 with the groove 10 or for disengaging it therefrom.

The support for guide rollers 14 or claw of the sprocket-wheel is formed by a body 15 provided with a lug 16 and with a cylindrical wall 17 located opposite the body of the sprocket-wheel 2.

The support is mounted in a sliding manner on the wall 4 of the apparatus by means of two headed screws 18.

The lug 16 is provided with two guide portions 19 sliding on the heads of the screws 18. It is also provided with an opening 20 in its central portion for the passage of the spindle 5 and of the washer 6 which it carries. The opening 20 is connected to the two guide portions 19. One of these is also connected to an opening 21 adapted to permit of the passage of the head of one of the screws 18.

To the opening 20 are also connected two recesses 22 and 23 co-operating with spring catches 24 and 25 formed by spring urged balls.

The arrangement of the recesses 22, 23 and of the catches 24, 25 is such that when the catch 25 engages with the recess 23, the rollers 14 are disengaged from the sprocket-wheel 2 and enable the film to be placed in position or removed. When the recess 22 engages with the catch 24, they are in contact with the supply device, in the operative position.

These two positions, well defined by the action of the catches 24, 25 are obtained simply by sliding the guides 19 on the bearing surface of the screws 18.

Figure 2:
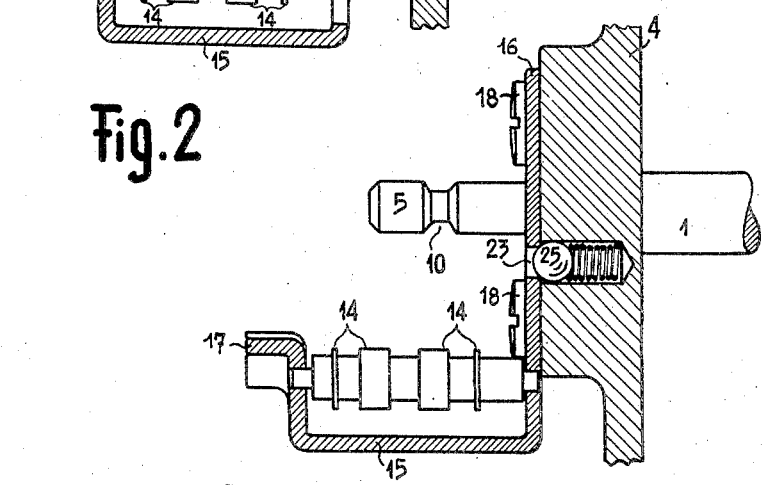
Fig. 2 is a section on the line II—II of Fig. 3, the sprocket wheel being removed.
Figure 3:
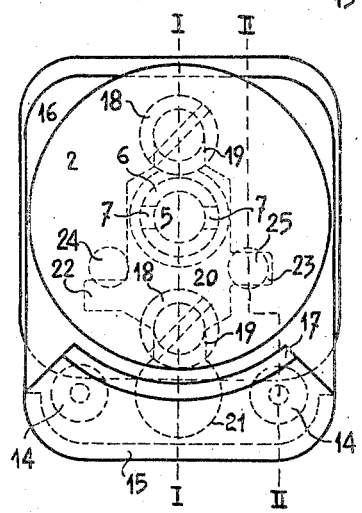
Fig. 3 is a front view of the support for the guide rollers, with its securing means.

For withdrawing and replacing the support 15, the sprocket wheel 2 is first removed from its spindle and the support 15 is pushed from the bottom upwards (Fig. 2) against the action of the catch 25, until the head of the lower screw 18 is opposite the opening 21. The head of the upper screw 18 is then opposite the opening 20.

It is then possible to remove the support 15 by moving it in the direction of the spindle 5. The placing in position takes place in a similar manner, the operations being carried out in the opposite direction.

It is to be noted that it is impossible to remove the support 15 as long as the sprocket wheel is on its spindle 5, the guide rollers 14 engaging the sprocket wheel 2 and thereby obstructing a displacement necessary for bringing the screws 18 in registry with opening 20 or 21 respectively.

I claim:

1. A device for driving a film in a cinematographic projector, comprising, a stationary wall, a spindle journaled in the wall, a sprocket wheel mounted on the spindle, means coupling the sprocket wheel to the spindle for rotation therewith, guide rollers guiding the film toward the sprocket wheel, a support supporting the rollers adjacent the sprocket wheel and including a slotted part extending at right angles to the rollers, said slotted part having slots each embodying a wide and a narrow portion, retaining elements fixed in the wall and each including a head spaced from the wall and on motion of the support part toward the wall passing through a wide slot portion and being larger than a narrower slot portion, the length of each slot requiring a motion of the support part parallel to the wall to a position registering the head of each retaining element with its wide slot portion of greater distance than that of the possible motion of the rollers to engage the sprocket wheel.

2. The device according to claim 1 and wherein each retaining element also includes a shank portion of reduced section fitting the narrow slot portion and a slot is provided for each retaining element, the mounting of the support on the wall requiring a motion of the support toward the wall and another motion parallel thereto.

3. Device according to claim 1 and wherein the spindle has an annular groove with an inclined side remote from the wall and also comprising a spring urged ball seated in the sprocket wheel and solely engaging the inclined groove side to thereby push the sprocket wheel toward the wall and to maintain it in working position.

4. Device according to claim 3 and wherein the coupling means comprises teeth and the sprocket wheel has recesses receiving the teeth and the ball maintains the teeth in the recesses.

5. A device for driving a film in a cinematographic projector, comprising a stationary wall, a spindle journaled in the wall, a sprocket mounted on the spindle means coupling the sprocket to the spindle for rotation therewith, guide rollers guiding the film toward the sprocket, a support supporting the rollers adjacent the sprocket and including a slotted plate part extending at right angles to the rollers, said slotted plate part having slots each embodying a wide and a narrow portion retaining screws fixed in the wall and each having a head spaced from and on motion of the support plate toward the wall passing through a wide slot portion and being larger than a narrow slot portion, the length of each slot requiring a motion of the support plate parallel to the wall to a position registering each screw head with its wide slot portion of greater distance than that of the possible motion of the rollers to engage the sprocket.

6. The device of claim 5 and wherein the support plate has an opening for receiving the sprocket spindle and two holes and also comprising a pair of balls seated in the wall and each partly received in a plate hole when the plate is retained on the wall.

WALTER GUGGER.

References Cited in the file of this patent.

UNITED STATES PATENTS

| Number | Name | Date |
|---|---|---|
| 1,972,555 | Fear | Sept. 4, 1934 |
| 2,178,242 | Runge | Oct. 31, 1939 |
| 2,492,469 | Eisler et al. | Dec. 27, 1949 |
| 2,546,143 | Bailey | Mar. 27, 1951 |
| 2,549,271 | Wienke | Apr. 17, 1951 |

FOREIGN PATENTS

| Number | Country | Date |
|---|---|---|
| 401,977 | Great Britain | Nov. 23, 1933 |
| 633,127 | Germany | July 20, 1936 |